(12) United States Patent
Fujimoto et al.

(10) Patent No.: US 7,529,079 B2
(45) Date of Patent: May 5, 2009

(54) SOLID ELECTROLYTIC CAPACITOR AND PROCESS FOR FABRICATING SAME

(75) Inventors: Kazumasa Fujimoto, Saga-gun (JP); Hiromu Saito, Hamura (JP); Yasushi Yoshida, Fussa (JP); Yukio Takeda, Saitama (JP)

(73) Assignees: Sanyo Electric Co., Ltd., Morigushi-shi (JP); Saga Sanyo Industries Co., Ltd., Saga (JP); Japan Capacitor Industrial Co., Ltd., Tokyo (JP)

( * ) Notice: Subject to any disclaimer, the term of this patent is extended or adjusted under 35 U.S.C. 154(b) by 306 days.

(21) Appl. No.: 11/348,329

(22) Filed: Feb. 7, 2006

(65) Prior Publication Data
US 2006/0180474 A1    Aug. 17, 2006

(30) Foreign Application Priority Data
Feb. 14, 2005   (JP) .............................. 2005-035579

(51) Int. Cl.
*H01G 9/00* (2006.01)

(52) U.S. Cl. ...................... 361/523; 361/516; 361/519; 361/525; 361/528; 361/529

(58) Field of Classification Search ................. 361/523, 361/525–528, 529–534, 516–519, 504, 508, 361/540
See application file for complete search history.

(56) References Cited

U.S. PATENT DOCUMENTS 6,208,503 B1 * 3/2001 Shimada et al. ............. 361/523
6,307,735 B1 * 10/2001 Saito et al. .................. 361/517
6,510,044 B1 * 1/2003 Loffelholz et al. .......... 361/510
6,970,343 B2 * 11/2005 Hayashi et al. ............. 361/504

FOREIGN PATENT DOCUMENTS

| JP | 5-343267 | 12/1993 |
| JP | 8-288184 | 11/1996 |

* cited by examiner

*Primary Examiner*—Nguyen T Ha
(74) *Attorney, Agent, or Firm*—Westerman, Hattori, Daniels & Adrian, LLP.

(57) ABSTRACT

The invention provides a solid electrolytic capacitor wherein the anode has a dielectric oxide film of a structure less susceptible to damage due to mechanical stresses and which is diminished in leakage current and less prone to short-circuiting, and a process for fabricating the capacitor. The capacitor of the invention comprises an anode of aluminum having a dielectric oxide film formed over a surface thereof from amorphous alumina, and is characterized in that a plurality of tunnel-shaped etching pits are formed in the anode. The process of the invention for fabricating the solid electrolytic capacitor includes the steps of forming a plurality of tunnel-shaped etching pits in an aluminum material, effecting anodic oxidation by immersing the aluminum material in an electrolytic solution containing oxalic acid or the like, and effecting anodic oxidation by immersing the aluminum material in an electrolytic solution containing boric acid or like inorganic acid or a salt thereof or containing adipic acid or like organic acid or a salt thereof and applying a voltage at least three times the rated voltage of the capacitor.

4 Claims, 2 Drawing Sheets

SOLID ELECTROLYTIC CAPACITOR AND PROCESS FOR FABRICATING SAME

TECHNICAL FIELD

The present invention relates to solid electrolytic capacitors comprising an aluminum anode and a process for fabricating the capacitor.

BACKGROUND ART

Solid electrolytic capacitors comprising a TCNQ complex salt, polypyrrole or like high polymer serving as a solid electrolyte and an anode of aluminum foil, thin sheet or the like have found wide use in various electronic devices. There is in recent years a rapidly growing demand for solid electrolytic capacitors having higher voltage resistance. With such solid electrolytic capacitors, a dielectric oxide film or layer is formed over the surface of the anode as is well known. As a method of giving increased voltage resistance to solid electrolytic capacitors, i.e., to the dielectric oxide film thereof, it is practice to increase the voltage (formation voltage) to be applied to the aluminum material for use as an anode or to be made into an anode in the anodic oxidation step of forming the dielectric oxide film. In the common conventional process for fabricating solid electrolytic capacitors, the formation voltage for anodic oxidation is set at a level approximately three times the rated voltage of the capacitor.

However, if a voltage higher than this value is used for anodic oxidation, the solid electrolytic capacitor obtained has the problem of becoming susceptible to marked leakage current and to short-circuit failure. To overcome this problem, it is practice to form on the anode a dielectric oxide film from amorphous alumina instead of crystalline alumina (see, for example, JP 5-343267A). The dielectric oxide film of crystalline alumina undergoes volumetric shrinkage during formation to develop defects, whereas dielectric oxide film of amorphous alumina remains almost free of volumetric shrinkage during formation and is greatly diminished in defects. The leakage current or short-circuit failure of solid electrolytic capacitors is attributable to the defects in the dielectric oxide film, so that the formation of the dielectric oxide film from amorphous alumina provides solid electrolytic capacitors having high voltage resistance, diminished in leakage current and less prone to short-circuit failure.

The aluminum material to be used as or made into an anode, and the anode are subjected to a bending stress, tensile stress and like mechanical stresses (physical stresses) in the process for fabricating solid electrolytic capacitors. For example, in the case of solid electrolytic capacitors of the rolled-up type, a dielectric oxide film is formed on aluminum foil having a large width and to be made into anodes, followed by a cutting step, in which the aluminum foil of large width is cut into separate pieces of aluminum foil of reduced width, namely, into separate anodes. After the cutting step, a lead tab is joined to the anode by crimping, and the anode is connected to a lead wire by the lead tab terminal. The anode is then rolled up along with a cathode and separator paper to make a capacitor element.

If the anode is subjected to a mechanical stress in the cutting step, joining step or rolling-up step described above, the dielectric oxide film on the anode will be thereby injured to develop defects anew. If the defects thus subsequently occurring result in increased leakage current and more serious short-circuit failure in the solid electrolytic capacitor, the advantage of the dielectric oxide film of amorphous alumina becomes impaired. The present invention, which has overcome such problems, provides a solid electrolytic capacitor wherein the anode is provided with a dielectric oxide film of a structure less susceptible to damage or faults due to a mechanical stress and which is smaller in leakage current and less prone to short-circuit failure than conventional solid electrolytic capacitors, and a process for fabricating the capacitor.

SUMMARY OF THE INVENTION

The present invention provides a solid electrolytic capacitor comprising an anode of aluminum having a dielectric oxide film formed over a surface thereof from amorphous alumina, the solid electrolytic capacitor being characterized in that a plurality of tunnel-shaped etching pits are formed in the anode.

The present invention also provides a process for fabricating a solid electrolytic capacitor including the steps of forming a plurality of tunnel-shaped etching pits in an aluminum material for use as an anode of the capacitor by etching the aluminum material, effecting anodic oxidation by immersing the aluminum material in an electrolytic solution containing oxalic acid, phosphoric acid, sulfuric acid or the like, and effecting anodic oxidation by immersing the aluminum material in an electrolytic solution containing boric acid, phosphoric acid or like inorganic acid or a salt thereof or in an electrolytic solution containing adipic acid, azelaic acid or like organic acid or a salt thereof and applying a voltage at least three times the rated voltage of the capacitor.

The invention provides another process for fabricating a solid electrolytic capacitor including the steps of forming a plurality of tunnel-shaped etching pits in an aluminum material for use as an anode of the capacitor by etching the aluminum material, and effecting anodic oxidation by immersing the aluminum material in an electrolytic solution containing boric acid, phosphoric acid or like inorganic acid or a salt thereof or in an electrolytic solution containing adipic acid, azelaic acid or like organic acid or a salt thereof at a temperature of up to 50° C. without subjecting the aluminum material to a hydration step and applying a voltage at least three times the rated voltage of the capacitor.

The tunnel-shaped etching pits formed in the anode enable the anode to have a larger remaining aluminum portion than etching pits which resemble pores of common sponge, effectively diffusing the mechanical stress acting on the aluminum material and the anode during the fabrication process. With the solid electrolytic capacitor of the invention, the dielectric oxide film is consequently less susceptible to damage or faults in the fabrication process, rendering the capacitor smaller in leakage current and less prone to short-circuiting than conventional like capacitors. The capacitor fabrication process described provides solid electrolytic capacitors which are reduced in leakage current. The term "aluminum material" includes aluminum foil or a thin aluminum sheet to be used as or to be made into an anode.

Experiments conducted by the present inventor have revealed that the advantage of the invention can be realized remarkably when the ratio of etching pits having a diameter of 0.5 to 1.5 μm to all etching pits of the anode is at least 50%. Further it is also revealed that the advantage of the invention can be realized remarkably when the ratio of spacings of 0.5 to 1.0 μm between respective adjacent pairs of etching pits to all spacings between respective adjacent pairs of etching pits is at least 50%.

DESCRIPTION OF THE PREFERRED EMBODIMENT

Figure 1:
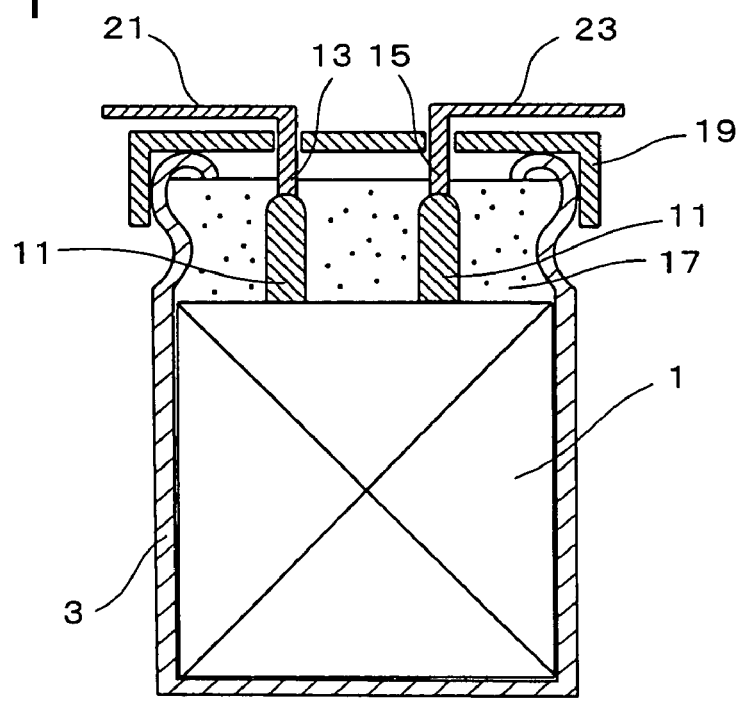
FIG. 1 is a sectional view of a solid electrolytic capacitor of the rolled-up type embodying the invention.
Figure 2:
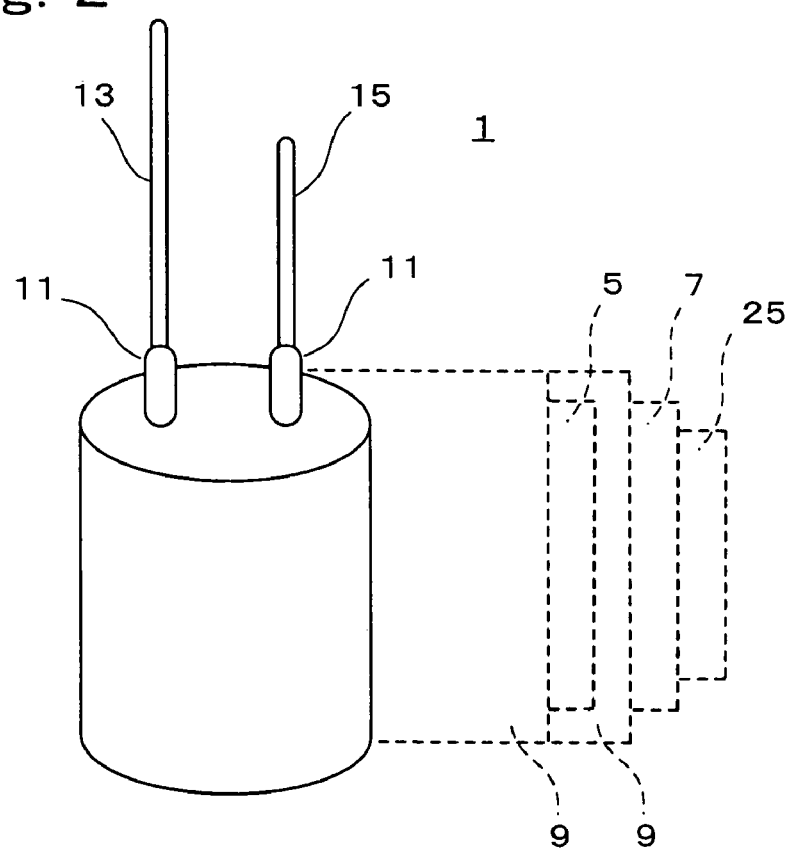
FIG. 2 is a perspective view of a capacitor element of the capacitor embodying the invention.

The present invention will be described below with reference to an embodiment thereof. FIG. 1 is a sectional view of the embodiment of the invention, i.e., a solid electrolytic capacitor of the rolled-up type, and FIG. 2 is a perspective view of a capacitor element 1 constituting the capacitor. The capacitor element 1 is disposed inside a bottomed tubular metal case 3. (FIG. 2 shows the capacitor element 1 before it is enclosed in the case 3.) The capacitor element 1 is generally in the form of a cylinder and is fabricated by winding an anode 5 and a cathode 7, each in the form of a strip of aluminum foil and, into a roll with separator paper 9 provided therebetween. (FIG. 2 shows the anode 5, separator paper, etc. as unwound and indicated in broken lines.) The anode 5 and the cathode 7 are connected to an anode lead wire 13 and a cathode lead wire 15 by lead tab terminals 11, 11, respectively. The space between the anode 5 and the cathode 7 is filled with a solid electrolyte layer (not shown) of TCNQ complex salt or electrically conductive high polymer. The conductive high polymer to be used is, for example, polypyrrole, polyfuran, polyaniline or the like.

Provided above the roll of capacitor element 1 is a sealing packing 17 of rubber (such as butyl rubber). The metal case 3 is locally constricted by drawing so as to compress the packing 17 and curled at its upper end. A seat plate 19 of insulating resin is so disposed as to close the opening of the metal case 3 and provided with an anode terminal 21 and a cathode terminal 23 thereon. In fabricating the capacitor, the packing 17 is provided on the roll of capacitor element 1, and the seat plate 19 is provided over the packing, with the lead wires 13, 15 so positioned as shown in FIG. 2. The lead wires 13, 15 extend through the packing 17 and the seat plate 19 to project from the upper surface of the seat plate 19. The projecting upper ends are each pressed into a thin plate, and the lead wires 13, 15 are then bent, whereby the anode terminal 21 and the cathode terminal 23 are arranged over the seat plate 19 as shown in FIG. 1.

The solid electrolytic capacitor of the invention is fabricated by the process to be described below in the case where a conductive high polymer is used as the solid electrolyte. The solid electrolytic capacitor of the invention is characterized by the construction of the anode 5. The anode 5 is made by treating and machining a strip of aluminum foil having a large width. The strip is prepared and then etched first. This etching step is performed to form a multiplicity of tunnel-shaped etching pits in opposite surfaces of the foil (approximately perpendicular to the foil surface). The particulars of the etching step are not limited specifically insofar as the object of the invention can be fulfilled, and advantage thereof can be ensured.

For example, the etching step includes a first stage of forming initial pits and a second stage of enlarging these pits. In the first stage, dc current is passed through the aluminum foil for dc etching using an aqueous solution of hydrochloric acid serving as an etchant and containing an acid such as oxalic acid, phosphoric acid or sulfuric acid added thereto. The length (depth), density and diameter of the etching pits to be formed are controlled by adjusting the current density and the amount of electricity.

After the completion of the first stage, the aluminum foil is washed and subjected to the second stage, in which the aluminum foil is immersed in an aqueous solution of sulfuric acid, nitric acid or the like to chemically dissolve the foil, whereby the pits are enlarged in diameter. The second stage may be followed by the hydration step of immersing the aluminum foil in pure water. When performed, the hydration step forms aluminum hydroxide on the surface of the aluminum foil. This results in promoted formation of an alumina layer and reduced power consumption in the anodic oxidation step to be described next.

Anodic oxidation is conducted after the etching step or hydration step to form on the surface of the aluminum foil a dielectric oxide film consisting essentially of amorphous alumina. For example, the anodic oxidation step includes a first stage and a second stage. In the first stage, the aluminum foil is immersed in an electrolytic solution containing an acid such as oxalic acid, phosphoric acid, sulfuric acid or the like and an anodic oxidation treatment is effected at a predetermined current density. The first stage performed forms a porous amorphous alumina layer (anodized layer of aluminum) over the aluminum foil. It is desirable to select the current density from the range of 10 to 1000 mA/cm$^2$.

In the second stage, the aluminum foil is immersed in an electrolytic solution containing boric acid, phosphoric acid or like inorganic acid or a salt thereof, or in an electrolytic solution containing adipic acid, azelaic acid or like organic acid or a salt thereof and then an anodic oxidation treatment is effected at a predetermined current density and a specified raised voltage. The electrolytic solution containing the inorganic acid may further contain a salt thereof added thereto, or when containing the organic acid, the electrolytic solution may further contain a salt thereof. Consequently, amorphous alumina grows from the pit bottom portions of the porous amorphous alumina layer formed by the first stage so as to fill the pits. Preferably, the raised voltage (formation voltage) to be applied is at least three times the rated voltage of the solid electrolytic capacitor to be fabricated. The current density is selected preferably from the range of 10 to 1000 mA/cm$^2$.

Instead of the first stage and the second stage, the anodic oxidation step may be performed alternatively by immersing the aluminum material in an electrolytic solution containing boric acid, phosphoric acid or like inorganic acid or a salt thereof, or in an electrolytic solution containing adipic acid, azelaic acid or like organic acid or a salt thereof and passing current at a predetermined current density and a specified raised voltage. In the case where the anodic oxidation step is performed in this way, the hydration step is not performed. The electrolytic solution may contain a salt of the inorganic acid in addition to the acid or a salt of the organic acid in addition to this acid. The electrolytic solution is preferably up to 50° C. in temperature. It is desirable that the formation voltage be at least three times the rated voltage, and that the current density be selected from the range of 10 to 500 mA/cm$^2$.

Figure 3:
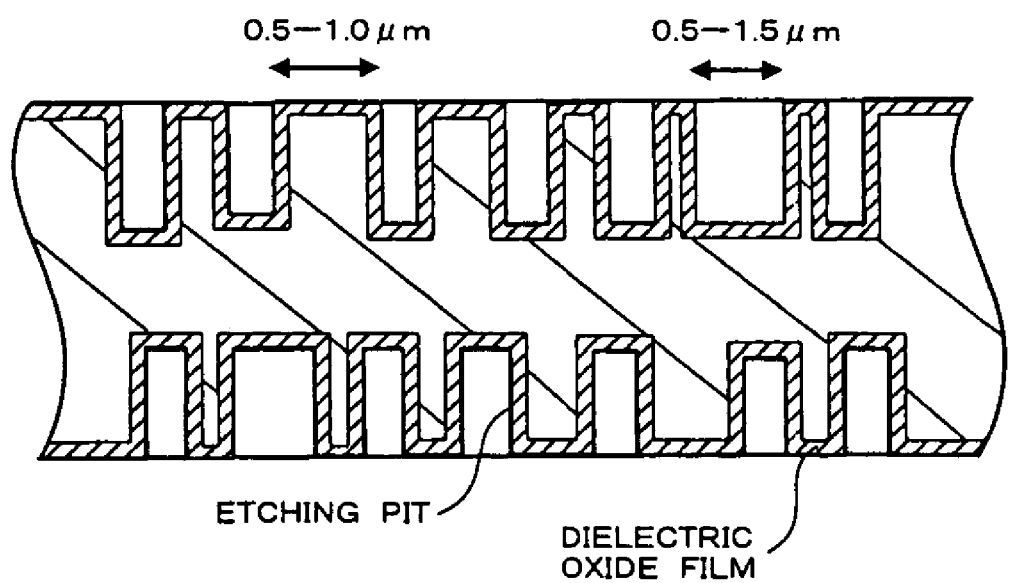
FIG. 3 is a diagram schematically showing in section aluminum foil for use in fabricating the solid electrolytic capacitor of the rolled-up type embodying the invention.

FIG. 3 is a diagram schematically showing in section the aluminum foil resulting from the anodic oxidation step, namely, after a dielectric oxide film has been formed on the foil. The aluminum foil to be made into the solid electrolytic capacitor of the rolled-up type of the invention is preferably 50 to 200 μm in thickness. The tunnel-shaped etching pits to be formed by the etching step are given such a diameter that the pits will not be closed even when the anodic oxidation step is formed at a high formation voltage. To ensure the advantage of the present invention, it is desired that at least 50% of the etching pits which are formed after the formation of dielectric oxide film have a diameter of 0.5 to 1.5 μm as will be described below. Further when each adjacent pair of etching pits are spaced apart by a certain distance, the remaining portion of the aluminum foil (the portion remaining after the etching step) will be greater, whereby the damage to the dielectric oxide film due to a mechanical stress can be suppressed more effectively. To ensure the advantage of the invention, therefore, it is desired that at least 50% of the spacings (edge-to-edge distances) between respective adjacent pairs of etching pits which are formed after the formation of dielectric anodic oxide film be 0.5 to 1.0 µm as will be described below. Preferably, the pits have a length less than half of the thickness of the aluminum foil as shown in FIG. 3. Furthermore, it is desired that the proportion of crystalline alumina in the dielectric oxide film be made small to the greatest possible extent. Stated more specifically, the dielectric oxide film formed on the aluminum foil is preferably up to 5% in the degree of crystallinity (mass fraction degree of crystallinity).

The etching step and the anodic oxidation step are followed by the step of cutting the aluminum foil to complete strips of anode 5 for use in capacitor elements 1. According to embodiments of the invention, aluminum foil is used also for the cathode 7. Like the anode foil, strips of cathode 7 are prepared by the step of etching, anodic oxidation step and cutting step. According to the present invention, however, the construction or structure of the cathode 7 is not limited particularly; the etching step and the oxidation step described above need not always be performed for making the cathode 7. For example, ac etching may be conducted to form in aluminum foil etching pits resembling those of sponge, or a dielectric oxide film comprising crystalline alumina may be formed on aluminum foil.

The anode 5 and the cathode 7 prepared are used for fabricating the capacitor element 1 shown in FIG. 2. First, a lead tab terminal 11 provided at one end of an anode lead wire 13 is joined to the anode 5 by crimping to connect the anode lead wire 13 to the anode 5. At the same time, a cathode lead wire 15 is connected to the cathode 7 by another lead tab terminal 11. The anode 5 and the cathode 7 are thereafter wound into a roll, with separator paper 9 provided therebetween. A holding tape 25 is provided around the roll of capacitor element 1.

The anode 5 and the cathode 7 are each made by cutting aluminum foil and therefore have cut ends which are not covered with any dielectric oxide film over the end faces. Accordingly, a dielectric oxide film is formed by a chemical conversion step over the cut end faces of the capacitor element 1 made as shown in FIG. 2. The capacitor element 1 is further heat-treated at a temperature of 150 to 300° C.

The heat treatment step is followed by the step of forming a conductive high polymer layer between the anode 5 of the capacitor element 1 and the cathode 7 thereof. This step is performed, for example, by placing a monomer, which is polymerizable into a conductive high polymer, into an oxidizer solution (such as an alcohol solution of ferric p-toluenesulfonate) to obtain a solution, impregnating the capacitor element 1 with the monomer solution and thermally polymerizing the monomer. The capacitor element 1 and a sealing packing 17 are thereafter placed into a metal case 3, which is then locally constricted by drawing and curled, followed by aging. A seal plate 19 is then provided, and the lead wires 13, 15 are finally machined to complete a solid electrolytic capacitor as shown in FIG. 1.

Solid electrolytic capacitors (10 mm in diameter and 8.0 mm in length), 50 V in rated voltage, were fabricated according to the invention. Solid electrolytic capacitors were similarly fabricated according to the prior art. The capacitors were then checked for characteristics for comparison. Twenty samples were fabricated in each of Examples and Comparative Examples with the results described below.

EXAMPLE 1

Solid electrolytic capacitors were prepared in the following manner in this example. Anodes 5 were made by treating and machining aluminum foil having a thickness of 100 µm. In the first stage of an etching step, the aluminum foil was subjected to dc etching in an aqueous solution of hydrochloric acid containing sulfuric acid at a current density of 50 mA/cm$^2$ for 5 minutes. In the second stage, the aluminum foil was immersed in 5 wt. % aqueous solution of nitric acid at 50° C. and chemically dissolved to enlarge the etching pits. Subsequent to the etching step, an anodic oxidation step was performed without conducting hydration. In the first stage of this step, the aluminum foil was immersed in an electrolytic solution of 5 g/L of oxalic acid and subjected to anodic oxidation at a current density of 200 mA/cm$^2$ for 7 minutes. In the second stage, the aluminum foil was immersed in an electrolytic solution of 1.0 g/L of ammonium pentaborate and held at a raised voltage of 150 V (three times the rated voltage 50V) for 15 minutes at a current density of 200 mA/cm$^2$. Consequently, in all the 20 samples, tunnel-shaped pits were formed in the anode 5, wherein the ratio of etching pits having a diameter of 0.5 to 1.5 µm and the ratio of spacings of 0.5 to 1.0 µm between respective adjacent pairs of pits is at least 50%.

The pits were checked for diameter and pit-to-pit spacing under a scanning electron microscope, and the ratios were calculated from the results.

Further in all the 20 samples, the dielectric oxide film of the anode 5 was up to 5% in the degree of crystallinity to find that the film was composed of amorphous alumina almost entirely. The degree of crystallinity was determined by checking the dielectric oxide film by X-ray diffractiometry and calculating the ratio of the measurement relative to an authentic sample which was composed of 100% of gamma-alumina. The capacitor element 1 was heat-treated at a temperature of 250° C. The solid electrolytic layer of the capacitor element 1 was prepared by thermal polymerization using 3,4-ethylenedioxythiophene as a monomer and an alcohol solution of ferric p-toluenesulfonate as an oxidizer solution. The cathode 7 was made by subjecting aluminum foil to ac etching in an aqueous hydrochloric acid solution containing sulfuric acid. The particulars concerning the cathode 7 and not mentioned are the same as those already described as to the anode 5.

EXAMPLE 2

Solid electrolytic capacitors were fabricated in the same manner as in Example 1 except that the formation voltage applied in the second stage of the anodic oxidation step was 250 V (five times the rated voltage 50V), with a longer period of time taken for the rise of voltage than in Example 1. In all the 20 samples of Example 2, tunnel-shaped pits were formed in the anode 5, wherein at least 50% of the tunnel-shaped pits had a diameter of 0.5 to 1.5 µm is at least 50% and at least 50% of the spacings between respective adjacent pairs of pits were 0.5 to 1.0 µm. All the 20 samples were also found to be up to 5% in the degree of crystallinity of the dielectric oxide film.

EXAMPLE 3

Solid electrolytic capacitors were fabricated in the same manner as in Example 1 except that the formation voltage applied in the second stage of the anodic oxidation step was 450 V (nine times the rated voltage), with a longer period of time taken for the rise of voltage than in Example 2. In all the 20 samples of Example 3, tunnel-shaped pits were formed in the anode 5, wherein at least 50% of the tunnel-shaped pits had a diameter of 0.5 to 1.5 µm and at least 50% of the spacings between respective adjacent pairs of pits were 0.5 to 1.0 μm. All the 20 samples were also found to be up to 5% in the degree of crystallinity of the dielectric oxide film.

Examples 1 to 3 are different in the formation voltage of the second stage of the anodic oxidation. For all the solid electrolytic capacitors of these examples, the ratio of tunnel-shaped pits having a diameter of 0.5 to 1.5 μm is at least 50% and the ratio of spacings of 0.5 to 1.0 μm between respective adjacent pairs of pits is at least 50%. This feature is attributable to the fact that the second stage of the anodic oxidation step causes amorphous alumina to grow from the pit bottom portions of the porous amorphous alumina layer formed by the first stage so as to fill the pits as already stated, with the result that differences in formation voltage produce no influence on the thickness of the dielectric oxide film

EXAMPLE 4

Solid electrolytic capacitors were fabricated in this example by subjecting aluminum foil to dc etching in an aqueous hydrochloric acid solution containing sulfuric acid at a current density of 75 mA/cm$^2$ for 5 minutes and thereafter immersing the foil in an aqueous solution of 5 wt. % of nitric acid at 50° C. to chemically dissolve the foil. Consequently, in all the 20 samples, tunnel-shaped pits formed in the anode 5, wherein at least 50% of the tunnel-shaped pits had a diameter of 0.5 to 1.5 μm and less than 40% of the spacings between respective adjacent pairs of pits were 0.5 to 1.0 μm. With the exception of this feature, the solid electrolytic capacitors obtained were the same as those fabricated in Example 2.

EXAMPLE 5

Solid electrolytic capacitors were fabricated in this example by subjecting aluminum foil to dc etching in an aqueous hydrochloric acid solution containing sulfuric acid at a current density of 50 mA/cm$^2$ for 5 minutes and thereafter immersing the foil in an aqueous solution of 2 wt. % of nitric acid at 50° C. to chemically dissolve the foil. Consequently, in all the 20 samples, tunnel-shaped pits formed in the anode 5, wherein less than 40% of the tunnel-shaped pits had a diameter of 0.5 to 1.5 μm and at least 50% of the spacings between respective adjacent pairs of pits were 0.5 to 1.0 μm. With the exception of this feature, the solid electrolytic capacitors obtained were the same as those fabricated in Example 2.

COMPARATIVE EXAMPLE 1

Solid electrolytic capacitors were fabricated in this comparative example by immersing aluminum foil in an electrolytic solution of 0.5 g/L of ammonium adipate at 85° C. after the completion of a hydration step, applying a raised voltage of 250 V to the solution at a current density of 200 mA/cm$^2$ and thereafter holding this voltage for 15 minutes for anodic oxidation. This step produced anodes 5 having a dielectric oxide film consisting substantially of crystalline alumina (80 to 95% in the degree of crystallinity). With the exception of these features, the solid electrolytic capacitors obtained were the same as those fabricated in Example 2.

COMPARATIVE EXAMPLE 2

Solid electrolytic capacitors were fabricated in this comparative example by subjecting aluminum foil to ac etching with sinusoidal current (50 Hz) at a current density of 200 mA/cm$^2$ in an aqueous solution containing hydrochloric acid and phosphoric acid, whereby anodes 5 were made which had etching pits resembling pores of sponge. With the exception of these features, the solid electrolytic capacitors obtained were the same as those fabricated in Example 2.

COMPARATIVE EXAMPLE 3

Solid electrolytic capacitors were fabricated in this comparative example by performing an etching step in the same manner as in Comparative Example 2, whereby anodes 5 were made which had etching pits resembling pores of sponge. The formation voltage used was 150 V. With the exception of these features, the solid electrolytic capacitors obtained were the same as those fabricated in Comparative Example 1.

COMPARATIVE EXAMPLES 4 AND 5

Solid electrolytic capacitors were fabricated using a formation voltage of 250 V in Comparative Example 4 and using a formation voltage of 450 V in Comparative Example 5. Otherwise, the capacitors were fabricated in the same manner as in Comparative example 3.

TABLE 1

| | Specifications of anode | | | | Incidence |
| --- | --- | --- | --- | --- | --- |
| | Film | Shape of pits | Ratio of pits having a diam. of 0.5–1.5 μm | Ratio of pit spacings of 0.5–1.0 μm | Formation voltage (V) | of short-circuiting (%) |
| Example 1 | Amorphous | Tunnels | At least 50% | At least 50% | 150 | 1.2 |
| Example 2 | Amorphous | Tunnels | At least 50% | At least 50% | 250 | 0.0 |
| Example 3 | Amorphous | Tunnels | At least 50% | At least 50% | 450 | 0.0 |
| Example 4 | Amorphous | Tunnels | At least 50% | Below 40% | 250 | 2.1 |
| Example 5 | Amorphous | Tunnels | Below 40% | At least 50% | 250 | 2.2 |
| Comp. Ex. 1 | Crystalline | Tunnels | At least 50% | At least 50% | 250 | 4.5 |
| Comp. Ex. 2 | Amorphous | Sponge | — | — | 250 | 7.6 |
| Comp. Ex. 3 | Crystalline | Sponge | — | — | 150 | 18.3 |
| Comp. Ex. 4 | Crystalline | Sponge | — | — | 250 | 16.7 |
| Comp. Ex. 5 | Crystalline | Sponge | — | — | 450 | 15.6 |

Table 1 shows the incidence of short-circuiting occurring in solid electrolytic capacitors of Examples and Comparative Examples during aging treatment which was conducted by applying a rated voltage of 50 V to the capacitors. The table reveals that the capacitors of Examples 1 to 5 wherein the anode 5 had tunnel-shaped etching pits and a dielectric oxide film of amorphous alumina are lower in the incidence of short-circuiting than those of Comparative Example 1 wherein the anode had tunnel-shaped pits and a dielectric oxide film of crystalline alumina, and are also lower in the incidence of short-circuiting than those of Comparative Example 2 wherein the anode had pits resembling sponge pores and a dielectric oxide film of amorphous alumina. Table 1 also shows that the capacitors of Examples 1 to 5 are lower in the incidence of short-circuiting than those of Comparative Examples 3 to 5 wherein the anode had pits resembling sponge pores and a dielectric oxide film of crystalline alumina.

Examples 1 to 3 indicate the capacitors of the invention are diminished in the incidence of short-circuiting regardless of the formation voltage for the anode 5. With attention directed to Examples 2 and 5 wherein the formation voltage was 250 V, it is understood that the capacitors of the invention are less susceptible to short-circuiting when the ratio of etching pits of the anode 5 having a diameter of 0.5 to 1.5 μm is at least 50%. With attention directed to Examples 2 and 4 wherein the formation voltage was 250 V, it is seen that the capacitors of the invention are less prone to short-circuiting if the ratio of spacings of 0.5 to 1.0 μm between adjacent pairs of pits is at least 50%.

had tunnel-shaped pits and a dielectric oxide film of crystalline alumina and with the capacitors of Comparative Example 2 wherein the anode had pits resembling pores of sponge and a dielectric oxide film of amorphous alumina. Table 2 also indicates that the capacitors of Examples 1 to 5 are much lower in leakage current than those of Comparative Examples 3 to 5 wherein the anode had pits resembling pores of sponge and a dielectric oxide film of crystalline alumina. It will be understood from Tables 1 and 2 that the capacitors of Examples 1 to 5 are comparable to those of Comparative Examples 1 to 5 in tangent of loss angle and equivalent series resistance, and that the present invention has the advantage of inhibiting short-circuiting and diminishing leakage current without impairing these electrical characteristics.

With attention directed to Examples 1 to 3 listed in Table 2, it will be understood that the capacitors of the invention are

TABLE 2

| | Specifications of anode | | | | Initial electrical characteristics | | | |
|---|---|---|---|---|---|---|---|---|
| | Film | Shape of pits | Ratio of pits having a diam. of 0.5–1.5 μm | Ratio of pit spacings of 0.5–1.0 μm | Formation voltage (V) | Cap. (μF) | tan δ (%) | ESR (mΩ) | LC (μA) |
| Example 1 | Amorphous | Tunnels | At least 50% | At least 50% | 150 | 7.3 | 0.7 | 31 | 2.3 |
| Example 2 | Amorphous | Tunnels | At least 50% | At least 50% | 250 | 3.4 | 0.6 | 36 | 1.1 |
| Example 3 | Amorphous | Tunnels | At least 50% | At least 50% | 450 | 1.3 | 0.5 | 40 | 0.7 |
| Example 4 | Amorphous | Tunnels | At least 50% | Below 40% | 250 | 3.8 | 0.6 | 35 | 3.6 |
| Example 5 | Amorphous | Tunnels | Below 40% | At least 50% | 250 | 3.0 | 0.6 | 36 | 3.5 |
| Comp. Ex. 1 | Crystalline | Tunnels | At least 50% | At least 50% | 250 | 6.9 | 0.5 | 34 | 13.2 |
| Comp. Ex. 2 | Amorphous | Sponge | — | — | 250 | 3.2 | 0.6 | 35 | 8.3 |
| Comp. Ex. 3 | Crystalline | Sponge | — | — | 150 | 15.1 | 0.7 | 30 | 80.9 |
| Comp. Ex. 4 | Crystalline | Sponge | — | — | 250 | 7.5 | 0.5 | 35 | 57.1 |
| Comp. Ex. 5 | Crystalline | Sponge | — | — | 450 | 2.7 | 0.5 | 42 | 30.6 |

Table 2 shows the initial electrical characteristics of the solid electrolytic capacitors of Examples and Comparative Examples. The initial electrical characteristics determined are capacitance (Cap.), tangent of loss angle (tan δ), equivalent series resistance (ESR) and leakage current (LC). Each of these values given in Table 2 is an average value of 20 samples. The values of capacitance and tangent of loss angle are measurements at a frequency of 120 Hz. The value of equivalent series resistance is a measurement at a frequency of 100 kHz. The value of leakage current is a value resulting from the application of a rated voltage of 50 V for 2 minutes.

Table 2 reveals that the solid electrolytic capacitors of Examples 1 to 5 wherein the anode 5 had tunnel-shaped etching pits and a dielectric oxide film of amorphous alumina are greatly diminished in leakage current as compared with the capacitors of Comparative Example 1 wherein the anode reduced in leakage current regardless of the formation voltage for the anode 5. Attention focused on Examples 2 and 5 wherein the same level of formation voltage was used reveals that the invention produces a more remarkable effect to diminish leakage current when the ratio of pits having a diameter of 0.5 to 1.5 μm is at least 50%. Attention given to Examples 2 and 4 wherein the same level of formation voltage was used shows that the invention produces a more remarkable effect to diminish leakage current when the ratio of spacings of 0.5 to 1.0 μm between respective adjacent pairs of pits is at least 50%.

TABLE 3

| | Specifications of anode | | | | Formation voltage (V) | BDV value (V) |
|---|---|---|---|---|---|---|
| | Film | Shape of pits | Ratio of pits having a diam. of 0.5–1.5 μm | Ratio of pit spacings of 0.5–1.0 μm | | |
| Example 1 | Amorphous | Tunnels | At least 50% | At least 50% | 150 | 63 |
| Example 2 | Amorphous | Tunnels | At least 50% | At least 50% | 250 | 84 |
| Example 3 | Amorphous | Tunnels | At least 50% | At least 50% | 450 | 114 |
| Comp. Ex. 3 | Crystalline | Sponge | — | — | 150 | 58 |
| Comp. Ex. 4 | Crystalline | Sponge | — | — | 250 | 70 |
| Comp. Ex. 5 | Crystalline | Sponge | — | — | 450 | 83 |

Table 3 shows the BDV (breakdown voltage) values measured of the solid electrolytic capacitors of Examples 1 to 3 and those of Comparative Examples 3 to 5. The BDV value is a voltage value causing a dielectric breakdown (short-circuiting) to the capacitor when the voltage to be applied thereto is increased at a rate of 1 V/s at room temperature. With attention directed to Example 1 and Comparative Example 3 wherein the formation voltage is 150 V, the BDV value (63 V) of Example 1 is higher than the BDV value (58 V) of Comparative Example 3. With respect to Example 2 and Comparative Example 4 wherein the formation voltage is 250 V, and to Example 3 and Comparative Example 5 wherein the formation voltage is 450 V, the Example BDV values are higher than the Comparative Example BDV values. These features reveal that the present invention provides solid electrolytic capacitors which are lower in the incidence of short-circuiting and greatly diminished in leakage current and have a high BDV value, namely, high voltage resistance, regardless of the formation voltage. Thus, the present invention is extremely useful for fabricating solid electrolytic capacitors having a high rated voltage.

Although the present invention has been described above with reference to solid electrolytic capacitors of the rolled-up type, the invention is applicable to a wide variety of solid electrolytic capacitors comprising an anode of aluminum, for example, to those wherein a single plate of aluminum is used as the anode or to those of the stacked layer type. The etching step or the anodic oxidation step described may be performed alternatively for a thin aluminum sheet having a large width and an increased length. In the foregoing examples, pieces of aluminum foil of a size suited to capacitor elements 1 (i.e., as cut into a suitable size) may be subjected to the etching step or the anodic oxidation step.

The embodiment and examples given above are intended to illustrate the present invention and should not be construed as limiting the invention set forth in the appended claims or reducing the scope thereof. The construction of the capacitor of the invention is not limited to the above embodiment but can be modified variously within the technical scope defined in the claims.

The invention claimed is:

1. A process for fabricating a solid electrolytic capacitor including the steps of:
    forming a plurality of tunnel-shaped etching pits in an aluminum material for use as an anode of the capacitor by etching the aluminum material,
    effecting anodic oxidation by immersing the aluminum material in an electrolytic solution containing oxalic acid, phosphoric acid, sulfuric acid or the like, and
    effecting anodic oxidation by immersing the aluminum material in an electrolytic solution containing boric acid, phosphoric acid or like inorganic acid or a salt thereof or in an electrolytic solution containing adipic acid, azelaic acid or like organic acid or a salt thereof and applying a voltage at least three times the rated voltage of the capacitor.

2. A process for fabricating a solid electrolytic capacitor according to claim 1 wherein the step of forming the etching pits includes a first stage of forming initial pits and a second stage of enlarging the initial pits.

3. A process for fabricating a solid electrolytic capacitor including the steps of:
    forming a plurality of tunnel-shaped etching pits in an aluminum material for use as an anode of the capacitor by etching the aluminum material, and
    effecting anodic oxidation by immersing the aluminum material in an electrolytic solution containing boric acid, phosphoric acid or like inorganic acid or a salt thereof or in an electrolytic solution containing adipic acid, azelaic acid or like organic acid or a salt thereof at a temperature of up to 50° C. without subjecting the aluminum material to a hydration step and applying a voltage at least three times the rated voltage of the capacitor.

4. A process for fabricating a solid electrolytic capacitor according to claim 3 wherein the step of forming the etching pits includes a first stage of forming initial pits and a second stage of enlarging the initial pits.

* * * * *